May 15, 1934.  H. BEUKEMA  1,958,781

MILK BOTTLE HOLDER

Filed July 11, 1932

Inventor
Herman Beukema
By Livrance &
Van Outwerp
Attorneys

Patented May 15, 1934

1,958,781

UNITED STATES PATENT OFFICE 1,958,781

MILK BOTTLE HOLDER

Herman Beukema, Holland, Mich.

Application July 11, 1932, Serial No. 621,823

5 Claims. (Cl. 248—65)

This invention pertains generally to a holding device and more particularly to a holding means for supporting one or more milk bottles by the upper end thereof whereby the bottles are maintained in an upright and stable position.

One of the aims of my invention is to hold the bottle firmly and securely whereby there is no danger of the same being upset and broken or the milk spilled.

Another object of my invention is to provide means for sealing the upper end of the bottle whereby dirt, dust, etc., will be prevented from settling and accumulating upon the usual paper cap which covers and seals the bottle.

Yet another feature of my invention resides in the means for protecting the holding means against the entry of dirt when the milk bottles have been removed therefrom.

Briefly described, my invention consists of a closed sheet metal box having the desired number of keyhole slots in one of its sides, preferably the lower side. The enlarged end of each of the slots is of such size as to receive the bead of the usual milk or cream bottle and the restricted portion of the slot snugly receives the neck portion of the bottle. Closure means are provided for the slot and shutter means are located above the closure means, such shutter means flapping downwardly at all times to protect the tops of the milk bottles and, when no milk bottles are in the device, to maintain the keyhole slot closed. Thus, a double protection is had for the tops of the milk bottles and hence dust is prevented from accumulating thereon. Also rain and snow are excluded therefrom and furthermore dogs and cats cannot lick off any superfluous milk.

Further objects and advantages will be made evident hereinafter.

In the drawing, which is for illustrative purposes only:—

Similar numerals refer to similar parts throughout the several views.

Figure 1:
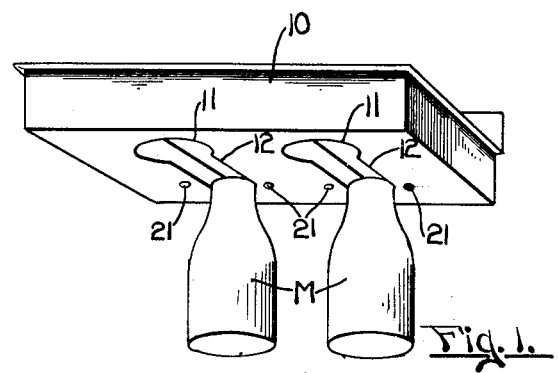
Fig. 1 is a perspective view of my invention as applied to a tightly sealed sheet metal box, the same being supported by any suitable means such as an outer wall of a house.

Numeral 10 indicates a sheet metal box having one or more keyhole slots therethrough. The keyhole slots have an enlarged end 11 and a restricted end 12 and the enlarged end 11 is of sufficient size to receive the bead of the usual milk or cream bottle M therethrough, the restricted portion 12 being of such width as to snugly engage the neck of the bottle, the bead being prevented from passing therethrough. The supporting box 10 is usually horizontally positioned as clearly shown in Fig. 1. Hence, the milk bottle end may be passed upwardly so that its bead extends through the opening 11 and then slid along the restricted portion 12 of the keyhole slot, the bead of the bottle securely supporting the same in position.

Figure 2:
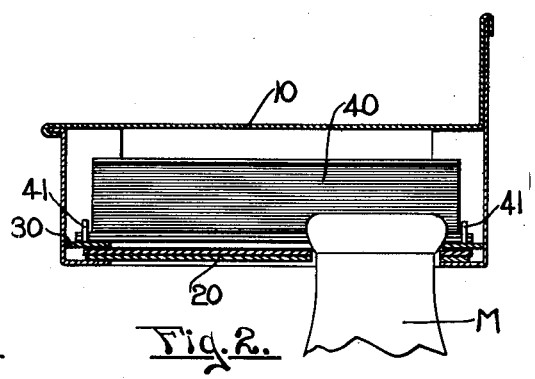
Fig. 2 is a cross sectional view taken longitudinally of a bottle receiving slot.
Figure 3:
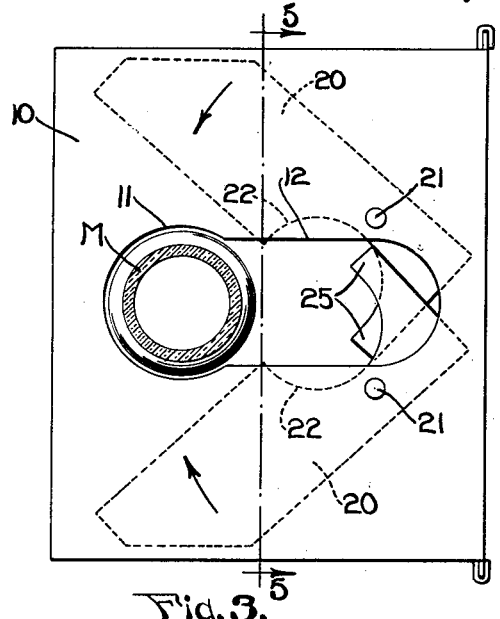
Fig. 3 is an under plan view of my invention with the closure members located in inoperative position.
Figure 4:
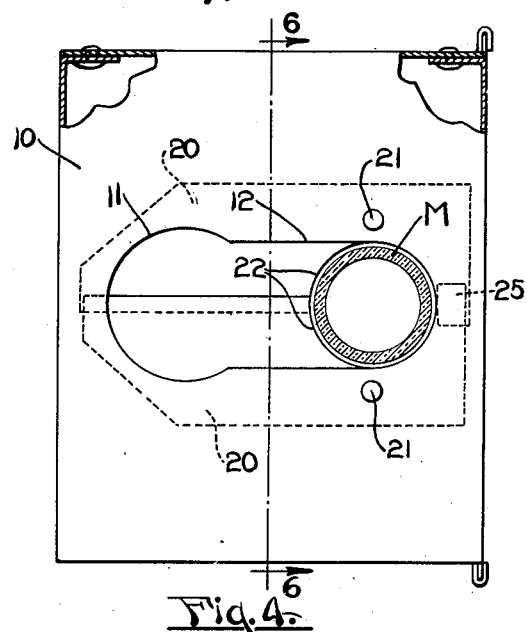
Fig. 4 is similar to Fig. 3 but shows the closure members in operative position.

Closure members 20, shown in dotted lines in Figs. 3 and 4, are pivotally mounted as at 21, this pivot extending downwardly through the box 10 and also upwardly through a plate member 30, this plate member having a keyhole slot directly above the slot in the bottom member of the box 10 and being supported a short distance thereabove whereby an operating chamber is had for the pivoted closure members 20, these closure members having portions 25 which extend into the path of the neck of the milk bottle whereby the closure members are moved from the positions shown in Fig. 3 to those shown in Fig. 4. That is, the milk bottle end is inserted upwardly through the enlarged portion 11 of the keyhole slot, see Fig. 3, and is then pushed or slid horizontally along the restricted portion 12 of the slot, the neck of the milk bottle abutting against the portions 25 whereupon continued pressure of the milk bottle will cause the closure members 20 to move in the direction indicated by the arrows in Fig. 3, to an overlapped position as clearly shown in Fig. 4. In this overlapped position the closure members tightly seal the opening, see Fig. 6, and the bead of the milk bottle may be supported by the concaved portions 22 of the closure members 20. It will be noted that the plate member 30, see Fig. 2, also tends to support the bead on the milk bottle and, as a matter of fact, it is immaterial whether the milk bottle bead rests upon the plate 30, the closure members 20 or the bottom member of the sheet metal box, as these members are all pivoted together and tend to support each other and the particular relationship between the bead and its supporting means depends largely upon the thickness of the sheet metal used and the accuracy in its manufacture.

Figure 5:
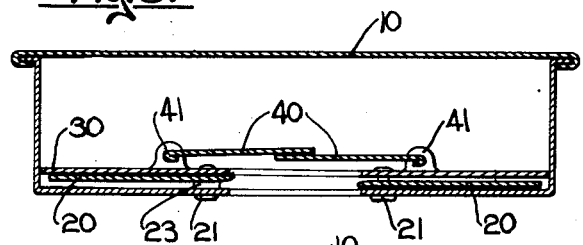
Fig. 5 is a view taken along the line 5—5 of Fig. 3.
Figure 6:
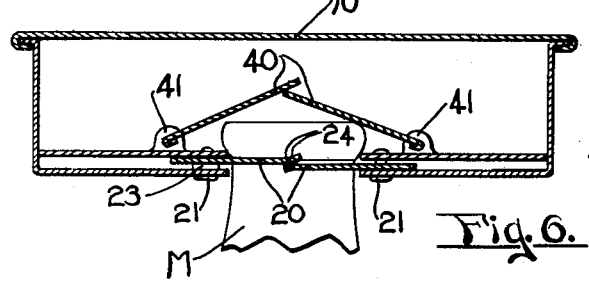
Fig. 6 is a view taken along the line 6—6 of Fig. 4.

As shown in Figs. 5 and 6, a washer member 23 may be inserted under one of the closure members 20 whereby proper overlapping is had. Furthermore the closure members have their contacting edges curved as indicated at 24.

Shutter members 40, see Figs. 2, 5 and 6, are pivotally mounted to ears 41 extending from the plate member 30. These shutter members are freely pivoted and assume an upper position as shown in Fig. 6 when the milk bottle is in position, such position providing a closed roof over the top of the milk bottle whereby dust and the like is prevented from settling on the cap of the bottle. Also, the box member 10 is of tight construction and this furnishes double protection for the milk bottle.

Whenever the milk bottle is withdrawn, this being accomplished by forcing the milk bottle in reverse manner to that used in its entry, the shutter members 40 gravitate downwardly to the position shown in Fig. 5 and hence close the keyhole slot thus preventing entry of dust, insects and the like into the box. This is necessary because the withdrawal of the milk bottle leaves the closure members 20 in an open position as is clearly shown in Fig. 3, friction maintaining the members in their positions.

The operation is readily apparent. The holder is installed in the desired location and the milkman inserts each bottle by inserting its bead through the enlarged portion of the slot and then sliding it so that contact is had against the portions 22 of the closure members whereby the closure members come together in overlapping position and also fit snugly around the neck of the milk bottle to support the same. During this manipulation the shutter members 40 are forced upwardly, see Fig. 6, and rest upon the top of the milk bottle.

Next, the used of the milk whenever desired, grasps the bottle and slides it in a reverse manner, the closure members 20 spreading apart under the pressure exerted and permitting the milk bottle to be slid to the enlarged portion 11 through which it may be withdrawn downwardly, the closure members 20 being left in an open position whereby the manipulation may be repeated whenever desired. The flaps 40 protect the keyhole slot during the interval that no milk bottle is held by the container.

Having thus revealed this invention, I claim as new and desire to secure the following combinations and elements, or equivalents thereof, by Letters Patent of the United States.

1. In combination, supporting means having an opening therethrough, said opening being enlarged at one place therein whereby the bead of an ordinary milk bottle may pass therethrough and restricted at another portion whereby said bead cannot pass therethrough, closure members for the said opening and means adapted to operate the said closure members, said operating means being located in the restricted portion of the opening for the purpose described, and said closure members overlapping when in the closed position to entirely close said opening, said closure members lying substantially in the same plane in opened position, the contacting edges of the closure members being curved to insure proper overlapping of the closure member as they are moved to closed position.

2. A milk bottle holder of the class described comprising, a casing having an opening therein, holding means adapted to be operated by the entry of the milk bottle therein to extend across the said opening and additional means to close the said opening when the first mentioned means is inoperative.

3. In a milk bottle holder comprising a support having a slot therein, said slot being adapted to slidably receive the neck of a milk bottle, closure means for said slot, means for operating said closure means, said operating means being engaged by the milk bottle when inserted into said slot and gravity operated means located above the top of the milk bottle to protect it from dirt and the like.

4. A milk bottle holder of the type set forth comprising, a closed casing having an opening therein, holding means actuated by entry of the top of the milk bottle into said opening to grip the said bottle and additional means to prevent entry of dust and the like through said opening when the said holding means is inoperative.

5. A milk bottle holder consisting of a metal casing having a slot therein, said slot being located in the bottom of the said casing, said slot being of sufficient size to receive the beaded end of the standard milk bottle, means for supporting the bottle in the casing against downward movement and gravity operated closure means for completely closing the slot at all times regardless of whether or not the bottle is located in the slot.

HERMAN BEUKEMA.